(12) United States Patent
Neterer

(10) Patent No.: US 9,776,544 B2
(45) Date of Patent: Oct. 3, 2017

(54) STOWABLE SEAT

(71) Applicant: NORCO INDUSTRIES, INC., Compton, CA (US)

(72) Inventor: Alan Neterer, Elkhart, IN (US)

(73) Assignee: NORCO INDUSTRIES, INC., Compton, CA (US)

(*) Notice: Subject to any disclaimer, the term of this patent is extended or adjusted under 35 U.S.C. 154(b) by 0 days.

(21) Appl. No.: 14/717,499

(22) Filed: May 20, 2015

(65) Prior Publication Data

US 2015/0343923 A1 Dec. 3, 2015

Related U.S. Application Data

(60) Provisional application No. 62/000,777, filed on May 20, 2014.

(51) Int. Cl.
| | | |
|---|---|---|
| *B60N 2/02* | (2006.01) | |
| *B60N 2/48* | (2006.01) | |
| *B60N 2/68* | (2006.01) | |
| *B60N 2/235* | (2006.01) | |
| *B60N 2/30* | (2006.01) | |
| *B60N 2/24* | (2006.01) | |

(52) U.S. Cl.
CPC .............. *B60N 2/68* (2013.01); *B60N 2/2356* (2013.01); *B60N 2/3011* (2013.01); *B60N 2/3043* (2013.01); *B60N 2/24* (2013.01); *B60N 2/242* (2013.01); *B60N 2/30* (2013.01); *B60N 2/304* (2013.01); *B60N 2/3045* (2013.01); *B60N 2/3061* (2013.01); *B60N 2/682* (2013.01); *B60N 2002/684* (2013.01)

(58) Field of Classification Search
CPC ...... B60N 2/68; B60N 2/3043; B60N 2/2356; B60N 2/3011; B60N 2/682; B60N 2/30; B60N 2/24; B60N 2/242; B60N 2002/684; B60N 2/304; B60N 2/3045; B60N 2/3061

USPC .............................. 297/378.1, 354.1, 353, 14
See application file for complete search history.

(56) References Cited

U.S. PATENT DOCUMENTS

| | | |
|---|---|---|
| 3,774,964 A | 11/1973 | Turner |
| 3,926,396 A | 12/1975 | Hall et al. |
| 4,040,660 A | 8/1977 | Barecki |
| 4,085,963 A | 4/1978 | Bullerdieck |
| 4,120,531 A | 10/1978 | Fefferman |
| 4,123,811 A | 11/1978 | Aldana |
| 4,218,091 A | 8/1980 | Webster |
| 4,431,233 A | 2/1984 | Ernst |
| 4,530,541 A | 7/1985 | Resag et al. |
| 4,579,386 A | 4/1986 | Rupp et al. |

(Continued)

FOREIGN PATENT DOCUMENTS

| | | |
|---|---|---|
| DE | 1901045 A1 | 8/1969 |
| DE | 1480466 A1 | 9/1969 |
| DE | 2360627 A1 | 6/1974 |

*Primary Examiner* — Chi Q Nguyen
(74) *Attorney, Agent, or Firm* — Vorys, Sater, Seymour and Pease LLP

(57) ABSTRACT

A stowable seat system includes a seat base and a seat frame operationally engaged with the seat base. The seat base includes a vehicle engagement portion adapted for operational engagement with an associated vehicle, and a seat engagement portion movably engaged with the vehicle engagement portion at a first actuation region. The seat frame includes a bottom portion, and a back portion movably engaged with the bottom portion at a second actuation region.

16 Claims, 23 Drawing Sheets

(56) References Cited

U.S. PATENT DOCUMENTS

| | | | |
|---|---|---|---|
| 4,589,301 A | 5/1986 | Griner | |
| 4,595,238 A | 6/1986 | Göldner | |
| 4,805,952 A | 2/1989 | Coleman | |
| 4,957,321 A * | 9/1990 | Martin | B60N 2/045 |
| | | | 296/65.09 |
| 4,971,379 A | 11/1990 | Rumpel et al. | |
| 5,310,247 A | 5/1994 | Fujimori et al. | |
| 5,318,341 A | 6/1994 | Griswold et al. | |
| 5,501,509 A | 3/1996 | Urrutia | |
| 5,597,205 A | 1/1997 | Glance | |
| 5,697,670 A | 12/1997 | Husted et al. | |
| 5,711,577 A | 1/1998 | Whalen | |
| 5,730,106 A | 3/1998 | Gonzalez | |
| 5,909,926 A | 6/1999 | Gonzalez | |
| 6,056,366 A | 5/2000 | Haynes et al. | |
| 6,106,066 A * | 8/2000 | Moffa | B60N 2/3011 |
| | | | 297/326 |
| 8,056,954 B2 * | 11/2011 | Homier | B60N 2/3013 |
| | | | 296/65.01 |
| 2005/0269842 A1 * | 12/2005 | Braun | B60N 2/242 |
| | | | 297/14 |
| 2007/0052255 A1 * | 3/2007 | O'Connor | B60N 2/01583 |
| | | | 296/65.03 |
| 2007/0096496 A1 * | 5/2007 | Saberan | B60N 2/045 |
| | | | 296/65.09 |
| 2008/0203772 A1 * | 8/2008 | Holdampf | B60N 2/3011 |
| | | | 297/15 |
| 2012/0153658 A1 * | 6/2012 | Kanda | B60N 2/1615 |
| | | | 296/65.13 |
| 2013/0341953 A1 * | 12/2013 | White | B60N 2/065 |
| | | | 296/65.01 |
| 2015/0069808 A1 * | 3/2015 | White | B60N 2/4855 |
| | | | 297/354.12 |
| 2015/0203011 A1 * | 7/2015 | Fujita | B60N 2/68 |
| | | | 297/284.11 |
| 2016/0001677 A1 * | 1/2016 | Stewart | B60N 2/22 |
| | | | 297/361.1 |

* cited by examiner

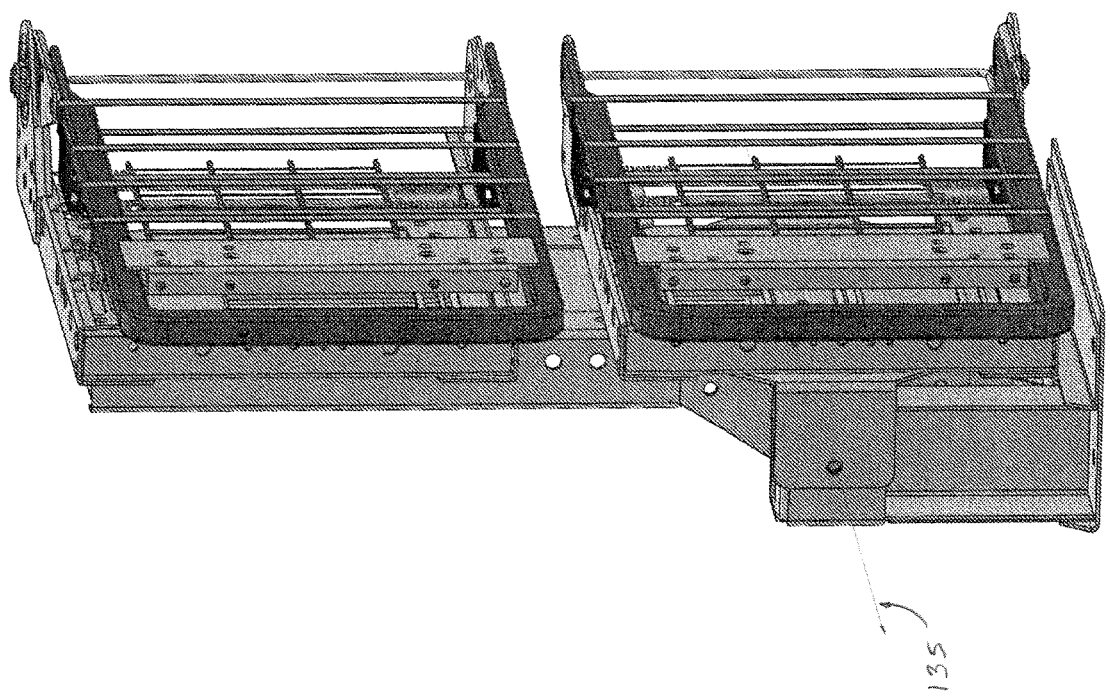

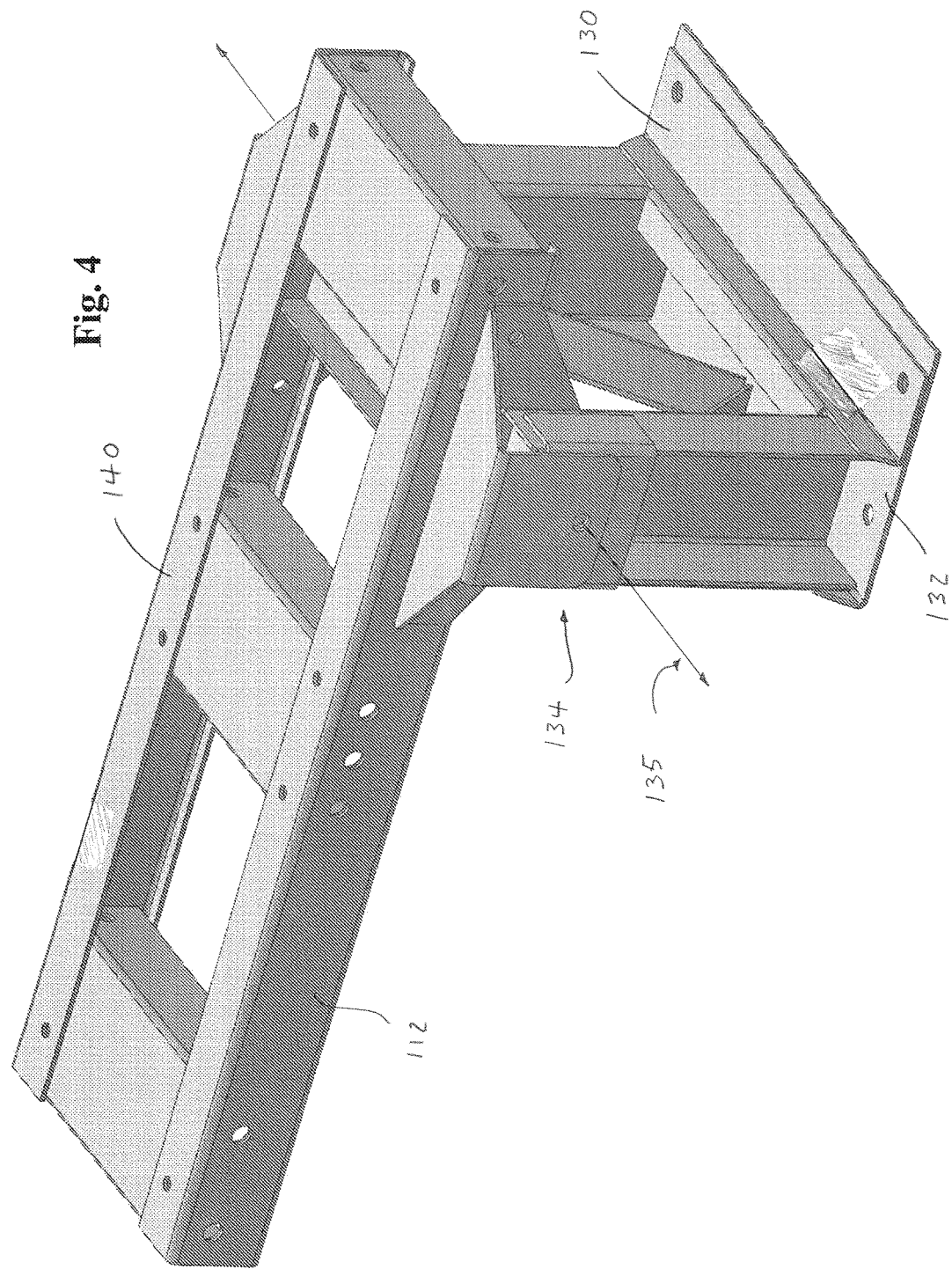

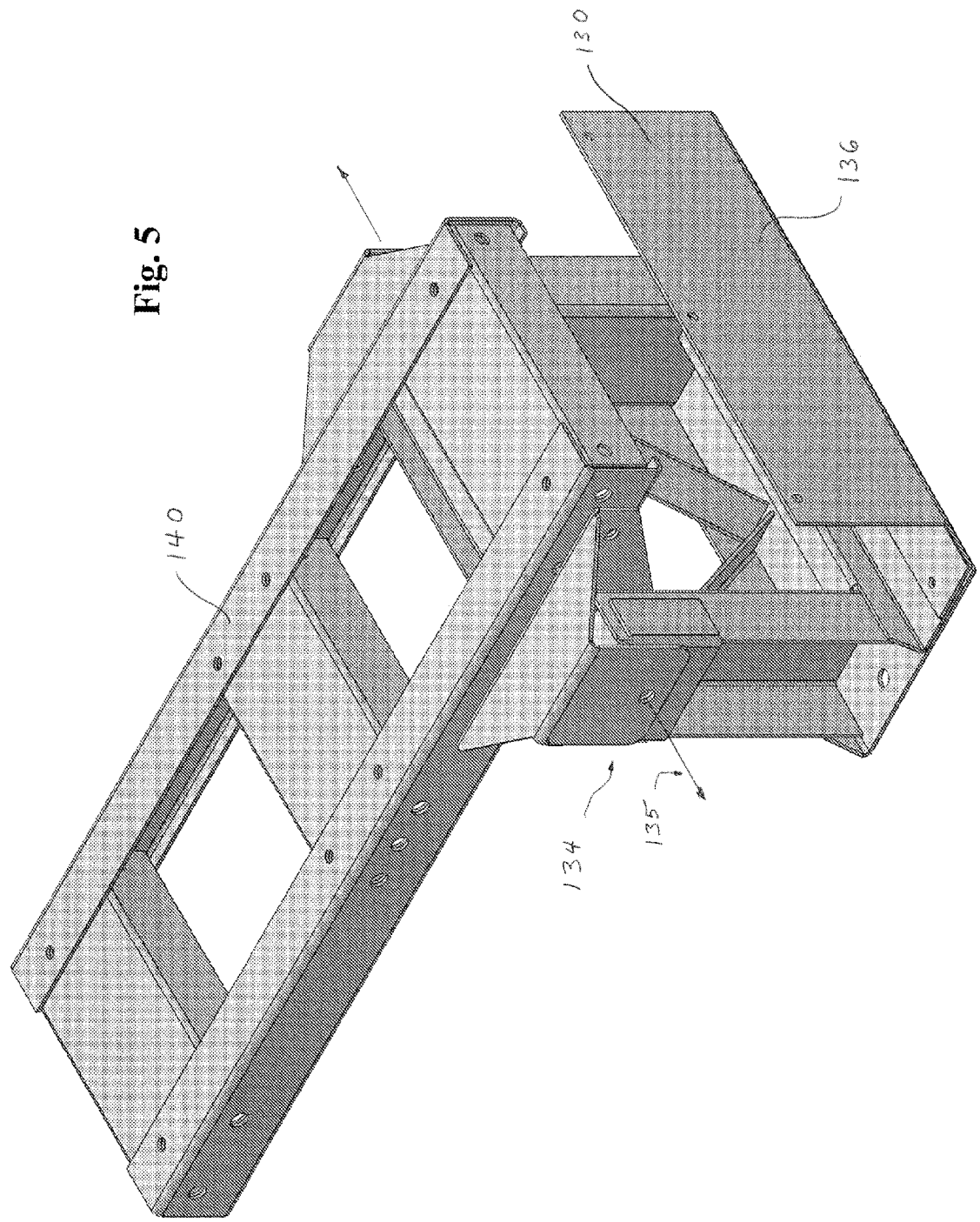

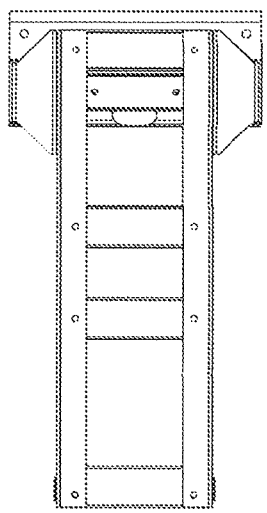
Fig. 6b
Fig. 6c
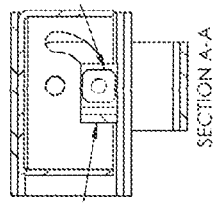
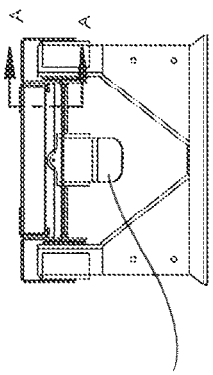
Fig. 6d
Fig. 6e
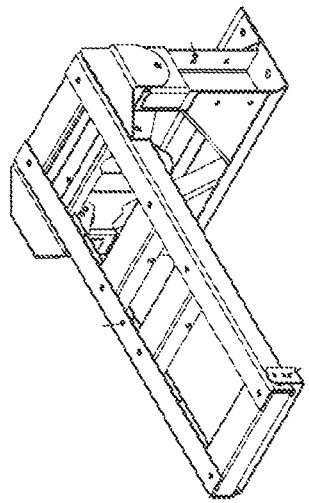
Fig. 6a

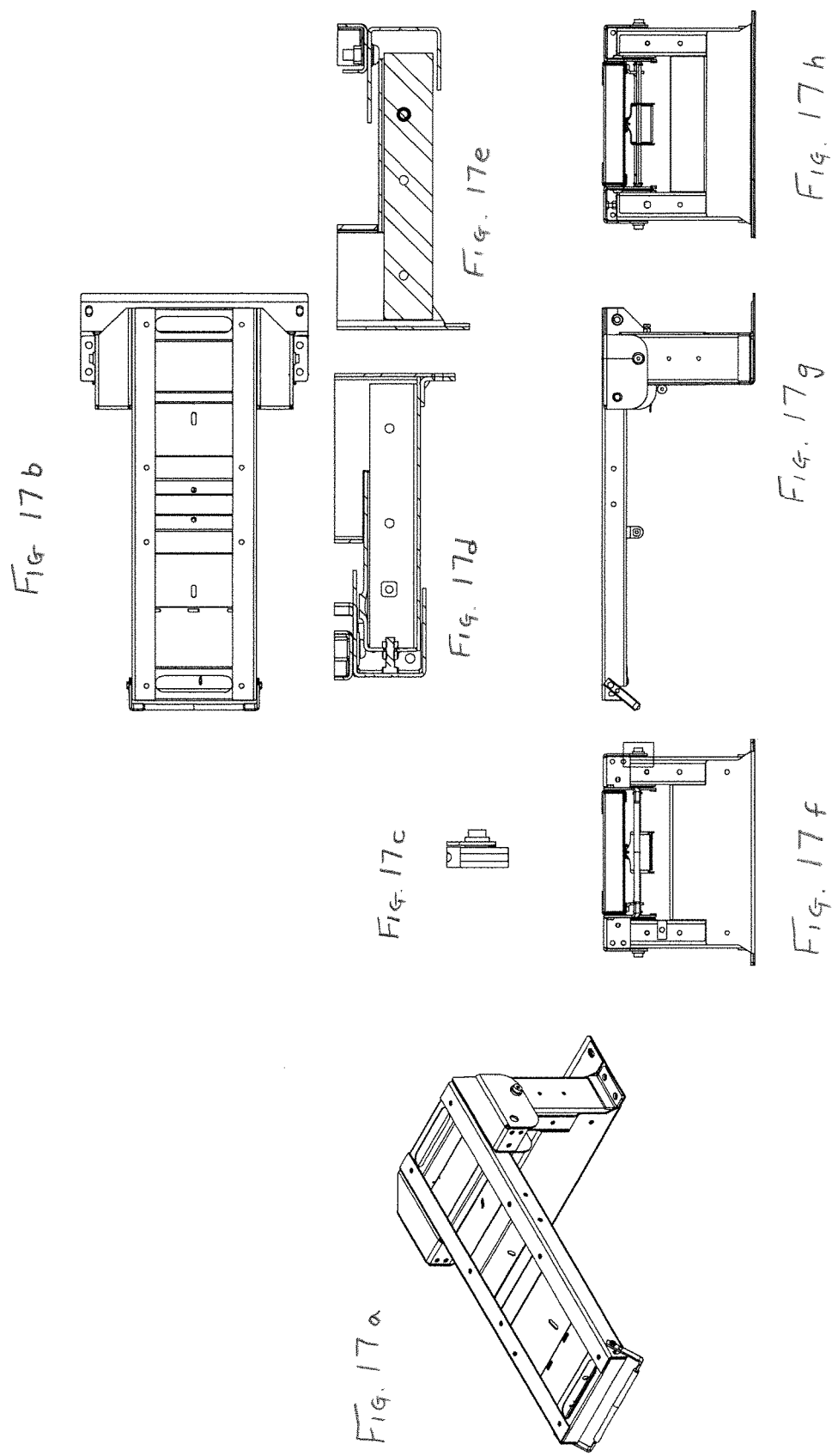

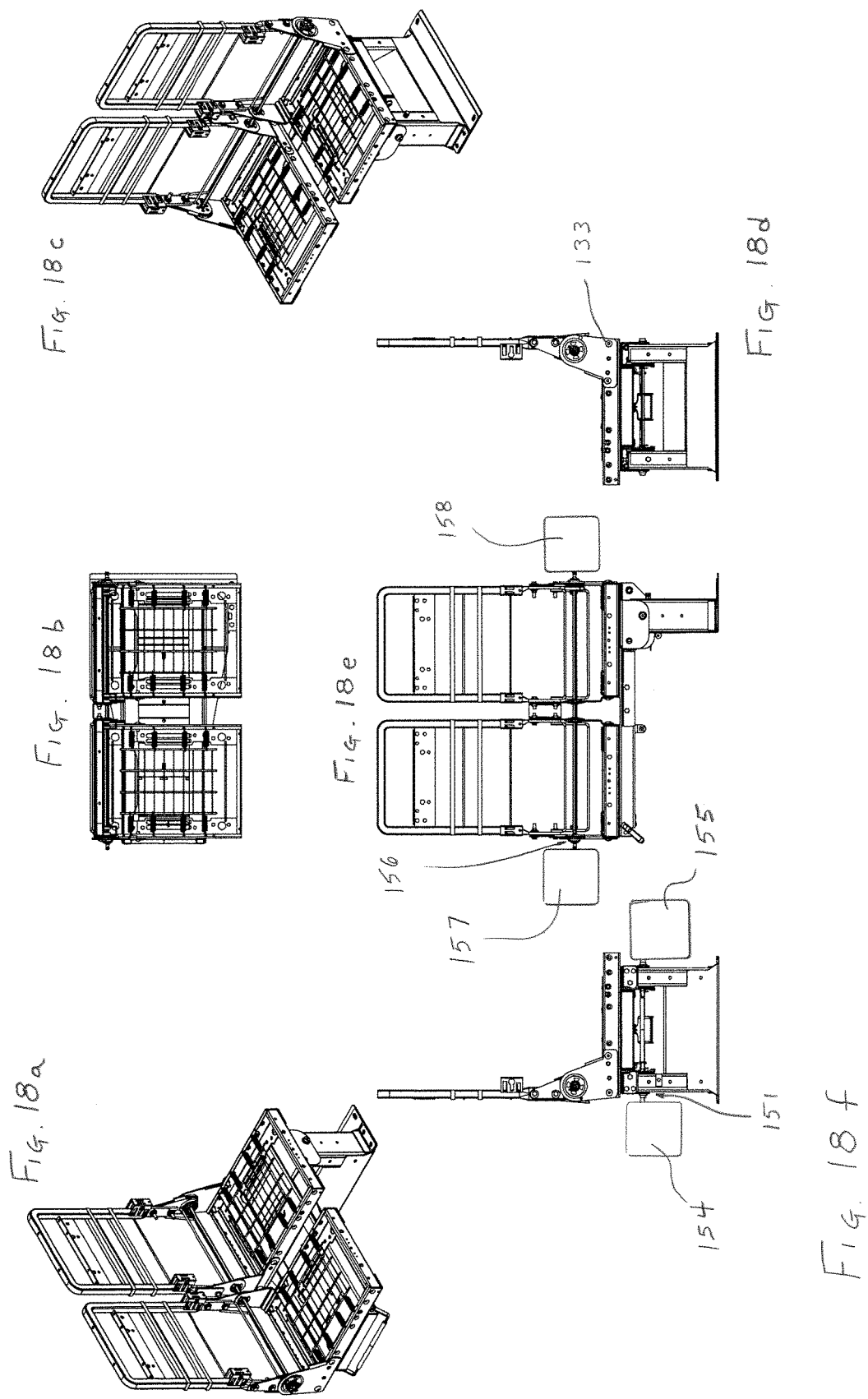

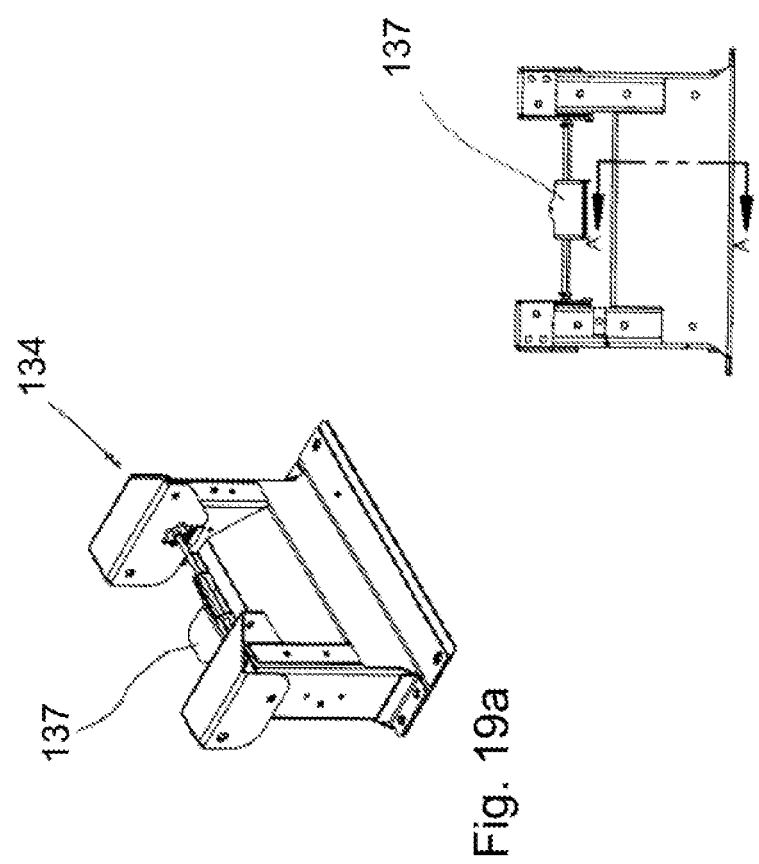

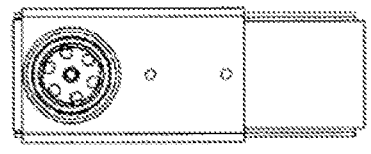
Fig. 22e          Fig. 22d
Fig. 22c
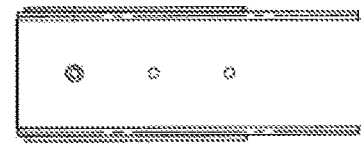
Fig. 22b
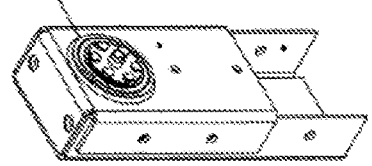
Fig. 22a

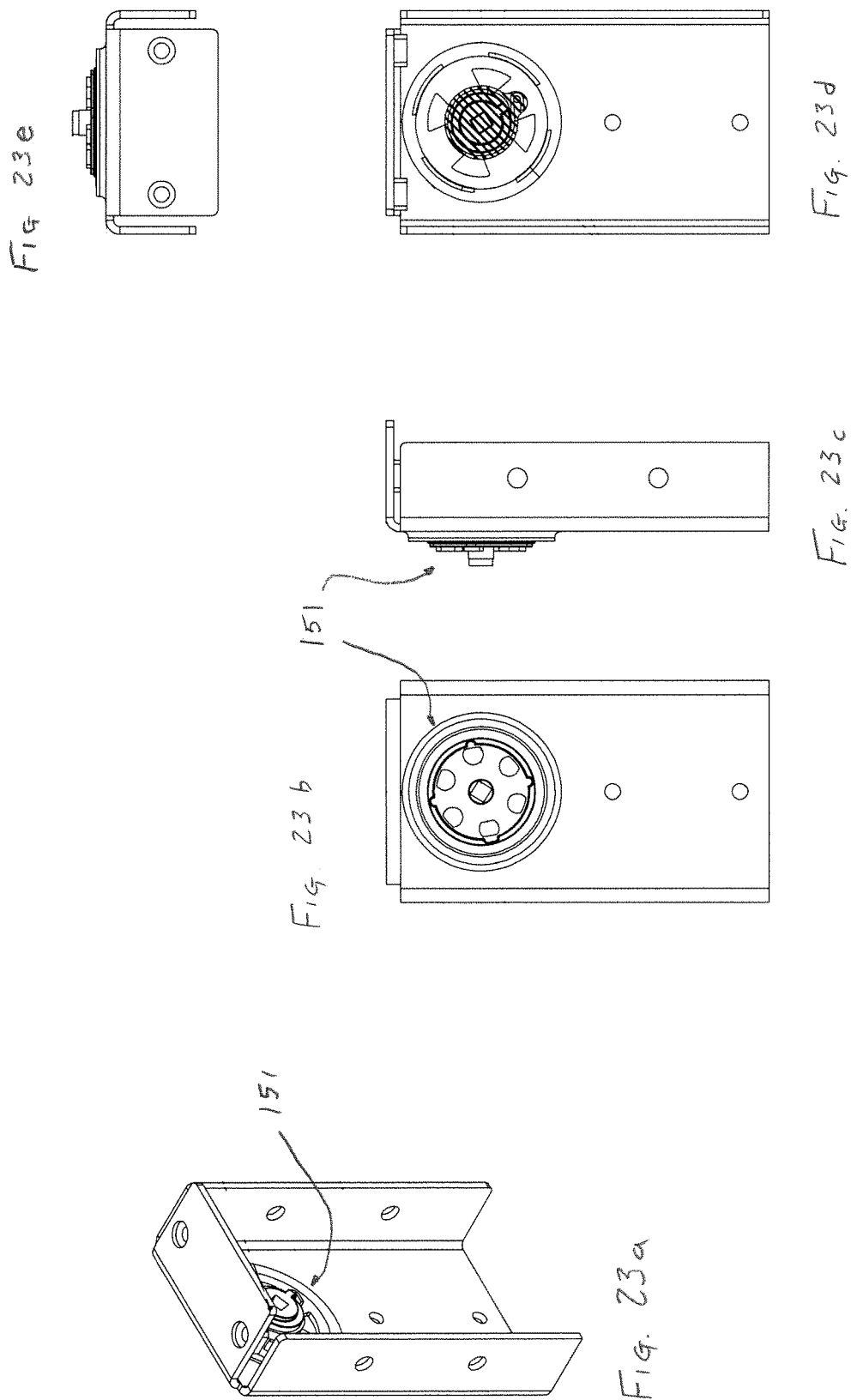

STOWABLE SEAT

CROSS-REFERENCE TO RELATED APPLICATION

This application claims the benefit of and priority to U.S. Provisional Application No. 62/000,777, filed May 20, 2014, the disclosure of which is hereby incorporated herein by reference in its entirety.

BACKGROUND AND SUMMARY

The present subject matter relates generally to seating. More specifically, the present subject matter relates to a stowable seat adapted for use in a vehicle.

Provided is a stowable seat system. The provided stowable seat system, or unit, is applicable to and adapted for use in a vehicle. A variety of vehicles, such as buses and trains, often include one or more stowable seats. A stowable seat may have a deployed orientation, which occupies a space and which is usable for the seating of conventional passengers, and a stored orientation, which vacates the space otherwise occupied by the deployed seat, making the space available such that a person in a wheelchair may be positioned for transport in that space. Such a seat may be designed to accommodate at least two passengers.

In order to be stowable and be properly supportive of a passenger when deployed, conventional stowable seats are typically extremely heavy and often weigh greater than 85 pounds. Due to the weight issue, and other design factors, these seats are hard to handle. For example, many of these seats currently have a seat deck that is a structural support portion and may be very cumbersome to handle.

Further, many conventional stowable seats utilize tube-in-tube pivoting construction and several different latching mechanisms, which may require many steps in order to operate the unit when transitioning between orientations. These units are typically manually operated and in order for these latches to be operated by hand, the play in them is quite noticeable, which in turn, creates undesirable rattling, noise, vibration, or harshness while the vehicle is in motion.

It remains desirable to provide a stowable seat with improved ease of use.

Provided is a stowable seat system comprising a seat base and a seat frame operationally engaged with the seat base. The seat base includes a vehicle engagement portion adapted for operational engagement with an associated vehicle, and a seat engagement portion movably engaged with the vehicle engagement portion at a first actuation region. The seat frame includes a bottom portion, and a back portion movably engaged with the bottom portion at a second actuation region.

BRIEF DESCRIPTION OF THE FIGURES

FIG. 3 is a view similar to FIG. 2, with the seat system in a stowed orientation.

FIG. 4 is an enlarged view of the seat base similar to FIG. 1 except with the seat frames removed.

FIG. 5 is a view similar to FIG. 4, except also including a wall mount.

FIG. 6*a* is a perspective view of the seat base.

FIG. 6*b* is a top view of the seat base.

FIG. 6*c* is a sectional view of the seat base taken along lines A-A in FIG. 6*e*.

FIG. 6*d* is a side view of the seat base.

FIG. 6*e* is an end view of the seat base.

FIG. 17*a* is a perspective view of the seat base.

FIG. 17*b* is a top view of the seat base.

FIG. 17*c* is an enlarged view of one part of the seat base at taken from the location indicated in FIG. 17*f*.

FIG. 17*d* is a first sectional view of a portion of the seat base of FIG. 17*b*.

FIG. 17*e* is a second sectional view of a portion of the seat base of FIG. 17*b*.

FIG. 17*f* is a first end view of the seat base.

FIG. 17*g* is a side view of the seat base.

FIG. 17*h* is a second end view of the seat base.

FIG. 18*a* shows a first perspective view of a stowable seat system.

FIG. 18*b* shows a top view of the stowable seat system.

FIG. 18*c* shows a second perspective view of the stowable seat system.

FIG. 18*d* shows a first end view of the stowable seat system.

FIG. 18*e* shows a side view of the stowable seat system.

FIG. 18*f* shows a second end view of the stowable seat system.

FIG. 19*a* shows a perspective view of part of the seat base.

FIG. 19*b* shows an end view of part of the seat base.

FIG. 22a shows a perspective view of yet another part of the seat base.

FIG. 22b shows a first side view of the part of the seat base.

FIG. 22c shows an end view of the part of the seat base.

FIG. 22d shows a second side view of the part of the seat base.

FIG. 22e shows a top view of the part of the seat base.

FIG. 23a shows a perspective view of even another part of the seat base.

FIG. 23b shows a first side view of the part of the seat base.

FIG. 23c shows an end view of the part of the seat base.

FIG. 23d shows a second side view of the part of the seat base.

FIG. 23e shows a top view of the part of the seat base.

DETAILED DESCRIPTION

Figure 1:
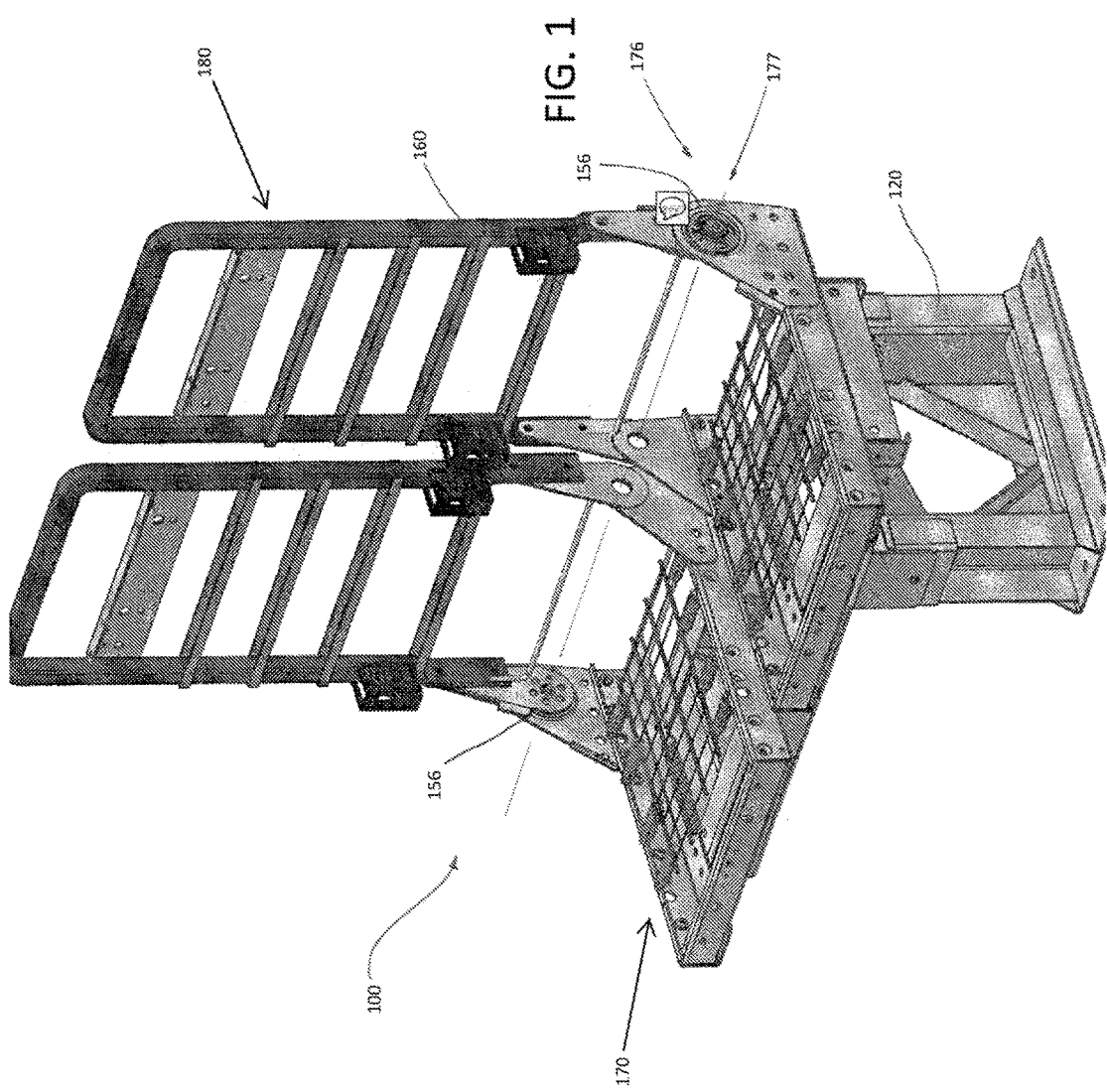
FIG. 1 is a perspective view of an embodiment of a stowable seat system including two seat frames on a seat base, all in their deployed orientations.
Figure 2:
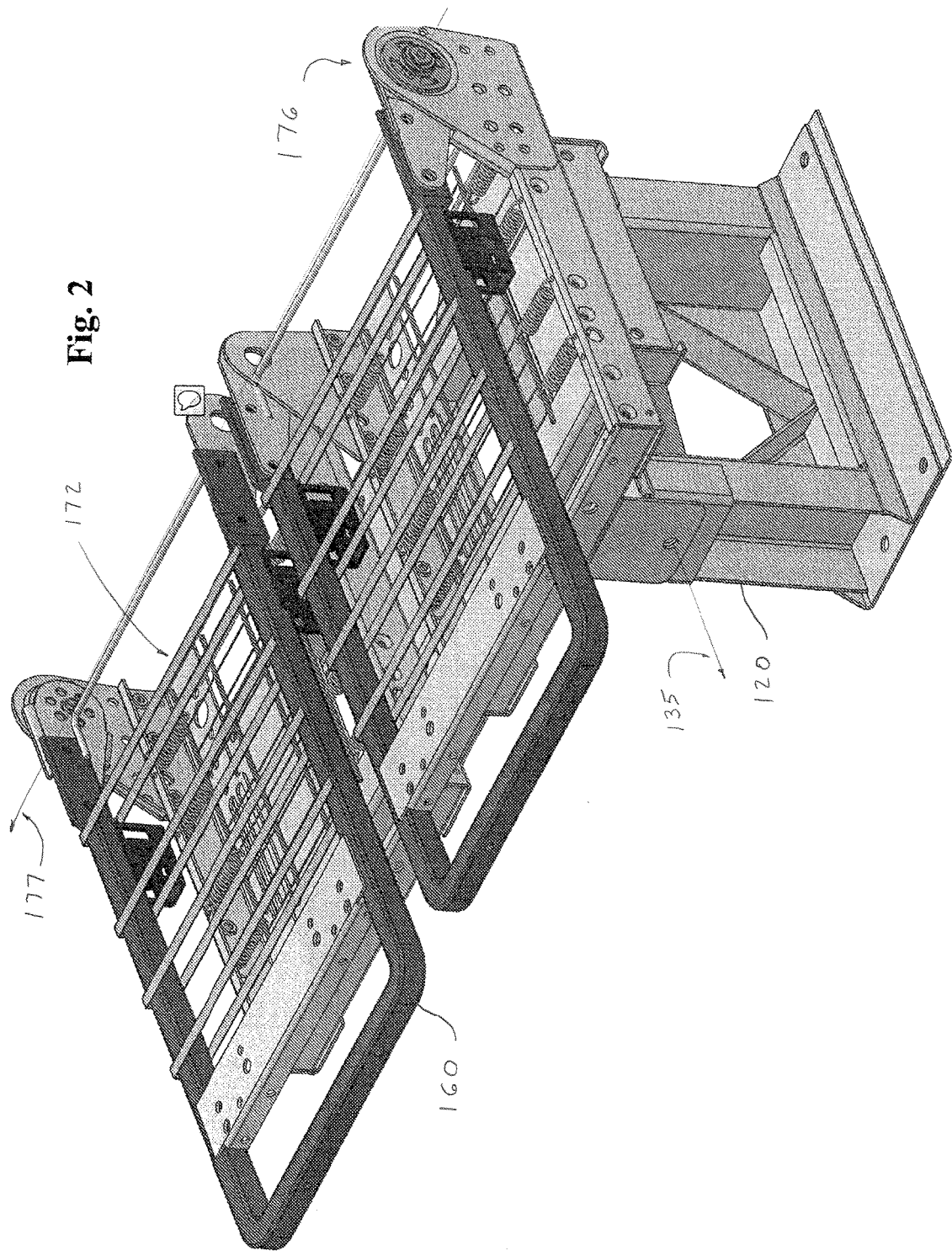
FIG. 2 is a view similar to FIG. 1, except with the seat frames having their seat back portions in their stowed orientations.
Figure 7:
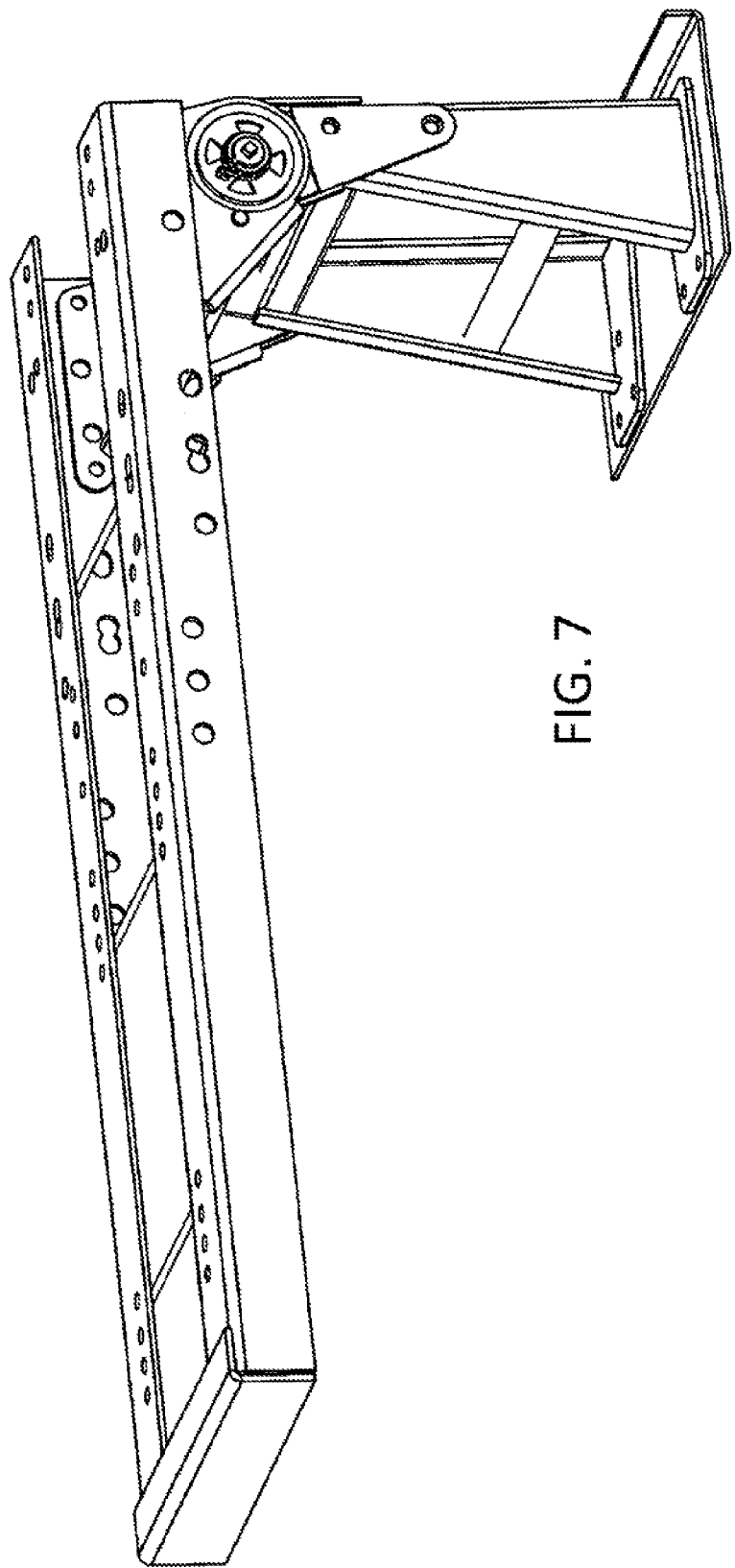
FIG. 7 is a photographic view of the seat base in the deployed orientation from a first side.
Figure 8:
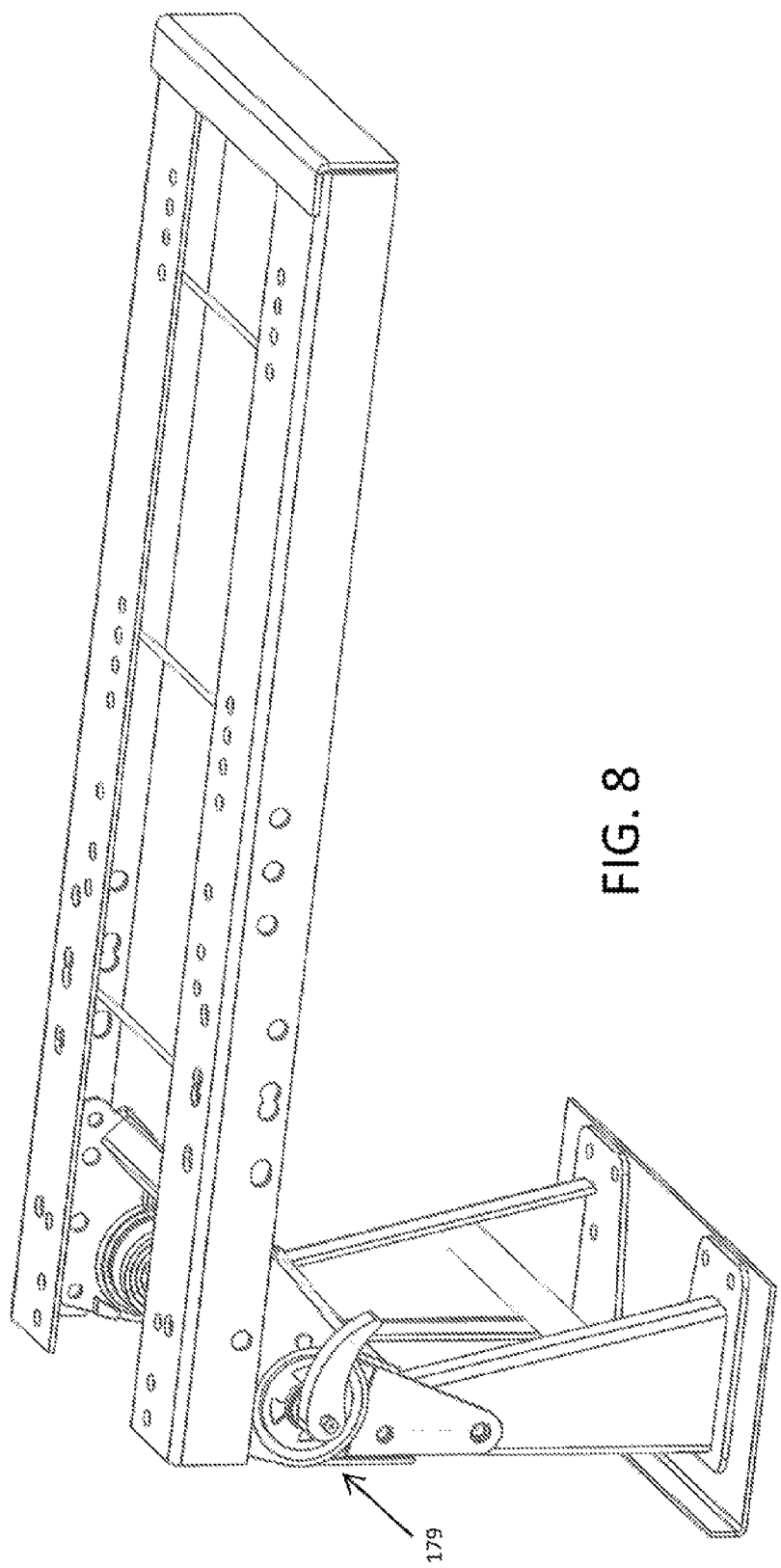
FIG. 8 is a photographic view of the seat base in the deployed orientation from a second side.
Figure 9:
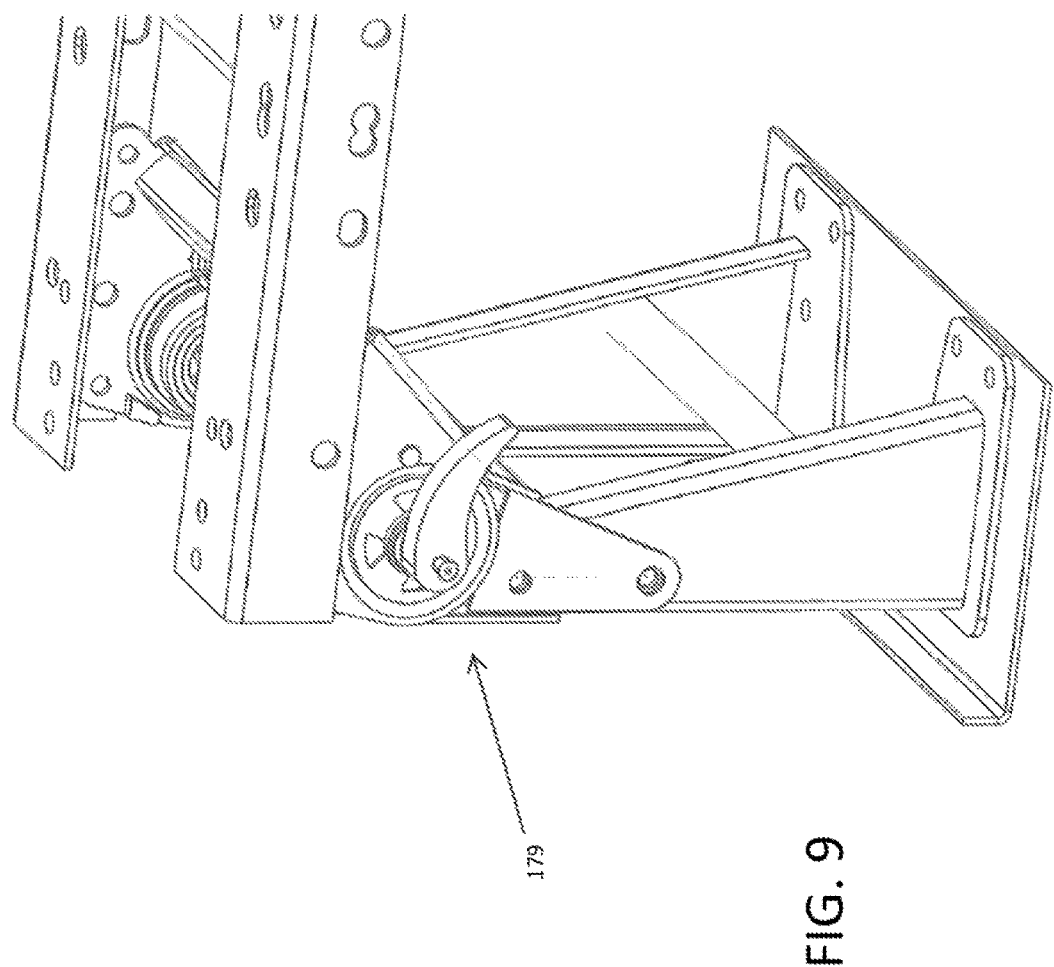
FIG. 9 is an enlarged view of a portion of FIG. 8.
Figure 10:
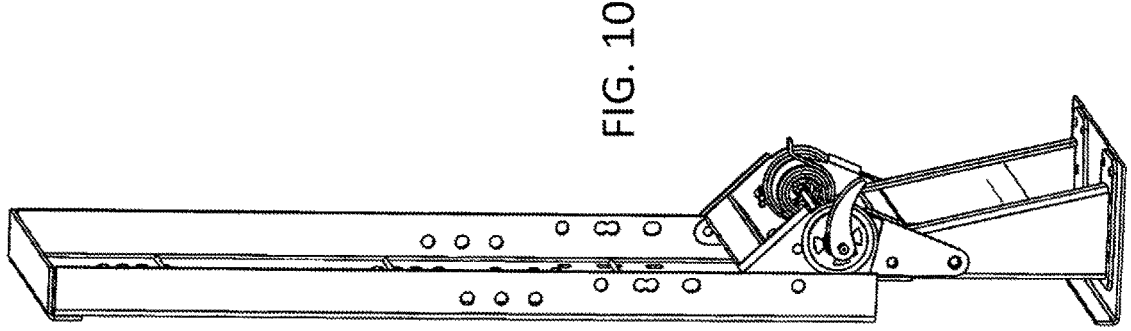
FIG. 10 is a photographic view of the seat base in the stowed orientation from the second side.
Figure 11:
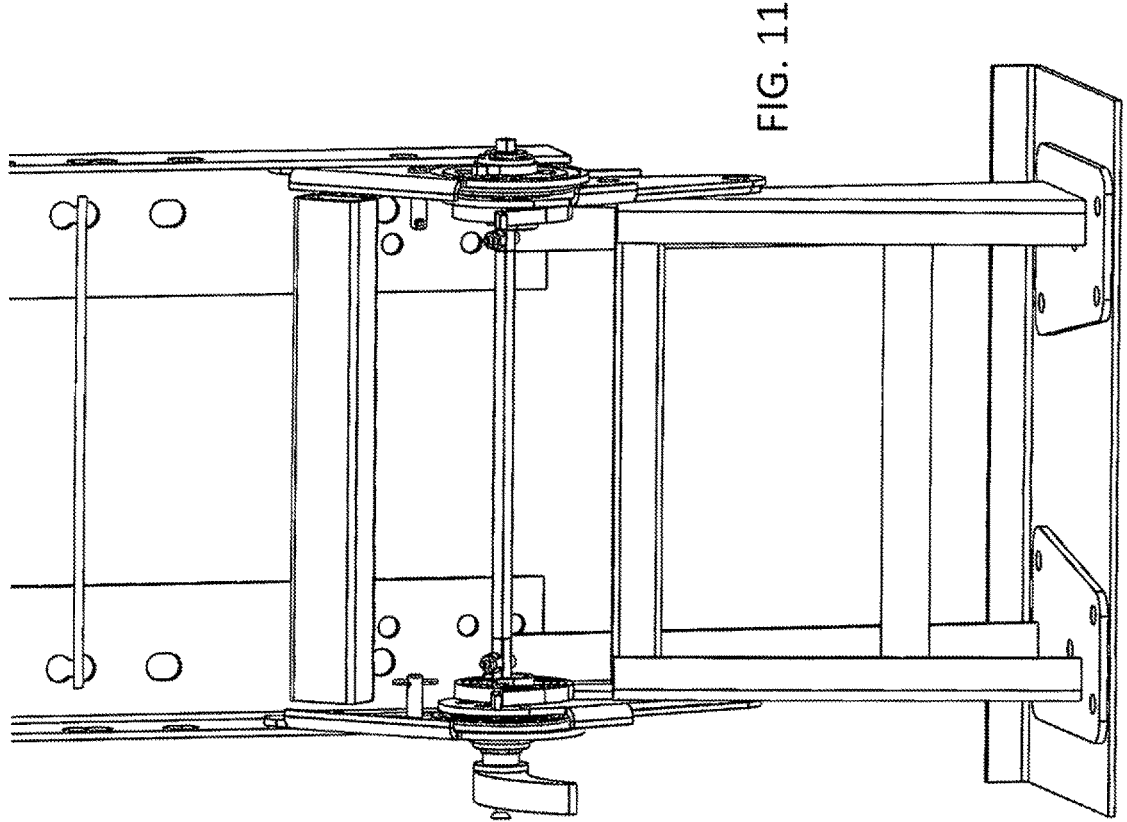
FIG. 11 is an enlarged view of a portion of the seat base in the stowed orientation from the front.
Figure 12:
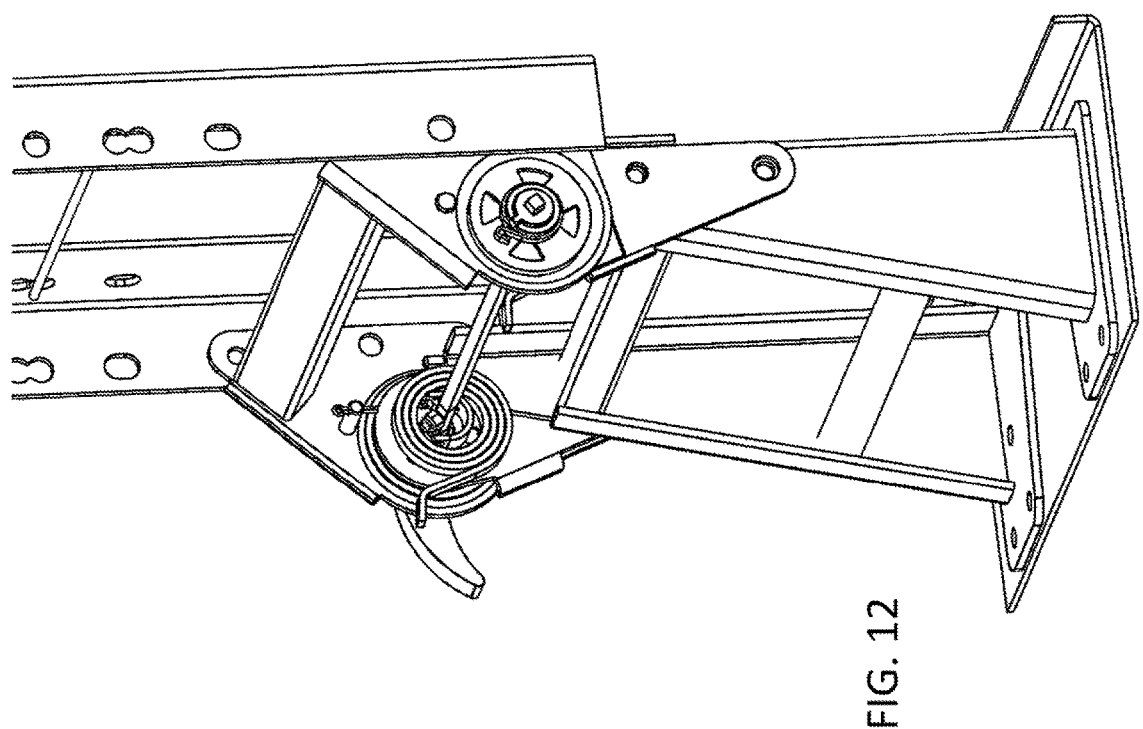
FIG. 12 is an enlarged view of a portion of the seat base in the stowed orientation from the second side.

Referring now to the drawings, there is illustrated in FIGS. 1-23e an embodiment of a stowable seat system 100 which includes a seat base 120 and one or more seat frames 160 operationally engaged with the seat base 120. The stowable seat system 100 may be used in buses, trains, and other transit vehicles that provides access for wheelchair occupants or other use of the space. The stowable seat system 100, when deployed, may act as a passenger seat. When stowed, the stowable seat system 100 provides access to floor space, allowing a wheelchair and occupant to occupy that space.

The seat base 120 includes a vehicle engagement portion 130 and a seat engagement portion 140 operationally engaged with the vehicle engagement portion 130. The vehicle engagement portion 130 includes one or more features to permit engagement with an associated vehicle (not shown).

As shown in FIG. 4, the vehicle engagement portion 130 is adapted for engagement with the floor (not shown) of an associated vehicle (not shown). A vehicle engagement portion 130 adapted for engagement with a floor may include a floor mating feature 132. The floor mating feature 132 is engaged, directly or indirectly, to the floor (not shown) with one or more mechanical engagement components 133. The mechanical engagement component 133 may be or include, but is not limited to, a mechanical fastener, such as a nut, bolt, rivet, pin, clip, or clamp; an adhesive; a weld joint; a brazing joint; a soldering joint; or other component adapted to provide similar physical engagement forces. Engaged with, and vertically offset from, the floor mating feature 132 is a first actuation region 134. The first actuation region 134 is adapted to permit seat engagement portion 140 and the vehicle engagement portion 130 to be moved with respect to one another. In the embodiment shown in FIGS. 1-23e the first actuation region 134 includes a pivot defining a first axis of rotation 135 that is substantially parallel to the floor such that seat engagement portion 140 may be rotated about the first axis of rotation 135 from the substantially horizontal orientation similar to that shown in FIGS. 1 and 4 to a substantially vertical orientation similar to that shown in FIGS. 3 and 10. In other acceptable embodiments, the first actuation region 134 may include a mechanism, such as, without limitation, a linkage, adapted to permit seat engagement portion 140 to be moved from a substantially horizontal orientation to a substantially vertical orientation.

As shown in FIG. 5, the vehicle engagement portion 130 is adapted for engagement with a wall (not shown) of an associated vehicle (not shown). A vehicle engagement portion 130 adapted for engagement with a wall includes an optional wall mating feature 136. The wall mating feature 136 is engaged, directly or indirectly, to the wall (not shown) with one or more mechanical engagement components 133. As noted above, a mechanical engagement component 133 may be or include, but is not limited to, a mechanical fastener, such as a nut, bolt, rivet, pin, clip, or clamp; an adhesive; a weld joint; a brazing joint; a soldering joint; or other component adapted to provide similar physical engagement forces. Engaged with, and horizontally offset from, the wall mating feature 136 is first actuation region 134. The first actuation region 134 is adapted to permit seat engagement portion 140 and the vehicle engagement portion 130 to be moved with respect to one another. In the embodiment shown in FIGS. 1-23e the first actuation region 134 includes a pivot defining a first axis of rotation 135 that is substantially parallel to the wall such that seat engagement portion 140 may be rotated about the first axis of rotation 135 from the substantially horizontal orientation similar to that shown in FIGS. 1 and 5 to a substantially vertical orientation similar to that shown in FIGS. 3 and 10. In other acceptable embodiments, the first actuation region 134 may be or include a mechanism, such as, without limitation, a linkage, adapted to permit seat engagement portion 140 to be moved from a substantially horizontal orientation to a substantially vertical orientation.

As shown in FIGS. 19-23e the first actuation region 134 is operationally engaged with a selectably releasable lock 151 adapted to hold the seat engagement portion 140 in a desired orientation with respect to the vehicle engagement portion 130. In one embodiment the selectably releasable lock may be a Fisher Dynamic brand heart hinge, part number 56118. The lock 151 may be selectably releasable by a lever or other manual latch 137. As shown in FIG. 18f, the lock 151 may be selectably releasable by a solenoid, motor, or other actuator 154 adapted to move the selectably releasable lock 151 into a desired orientation. As shown in the non-limiting embodiment in FIG. 18f, the lock 151 may be engaged with a proximity switch or other sensor 155 adapted to detect the state of lock 151. It should be understood that, in other embodiments, one or more sensors 155 could be used to detect the orientation of one or more components of the stowable seat system 100.

As will be described in further detail below, the seat base 120 supports one or more seat frames 160 on the seat engagement portion 140 with the seat engagement portion 140 engaged in a cantilever arrangement with respect to the vehicle engagement portion 130. In some embodiments, it is desirable for the seat engagement portion 140 to resist substantial deflection even when subjected to a substantial load. In some embodiments, the stowable seat system 100 and the components thereof meet or surpass the relevant Federal Motor Vehicle Safety Standards. In some embodiments, the stowable seat system 100 and the components thereof meet or surpass by 115% the Federal Motor Vehicle Safety Standard No. 207 for Multipurpose Passenger Vehicles, Trucks, and Buses as it existed on May 20, 2014. In some embodiments the components of the stowable seat system 100 may include one or more metal structural members 112. The metal structural members 112 may be formed, in whole or part, from iron, iron alloy, steel, stainless steel, aluminum, aluminum alloy, or other structural material commonly selected for use in vehicle components. In one embodiment, a stowable seating unit weighs less than a conventional stowable seating unit.

Figure 14:
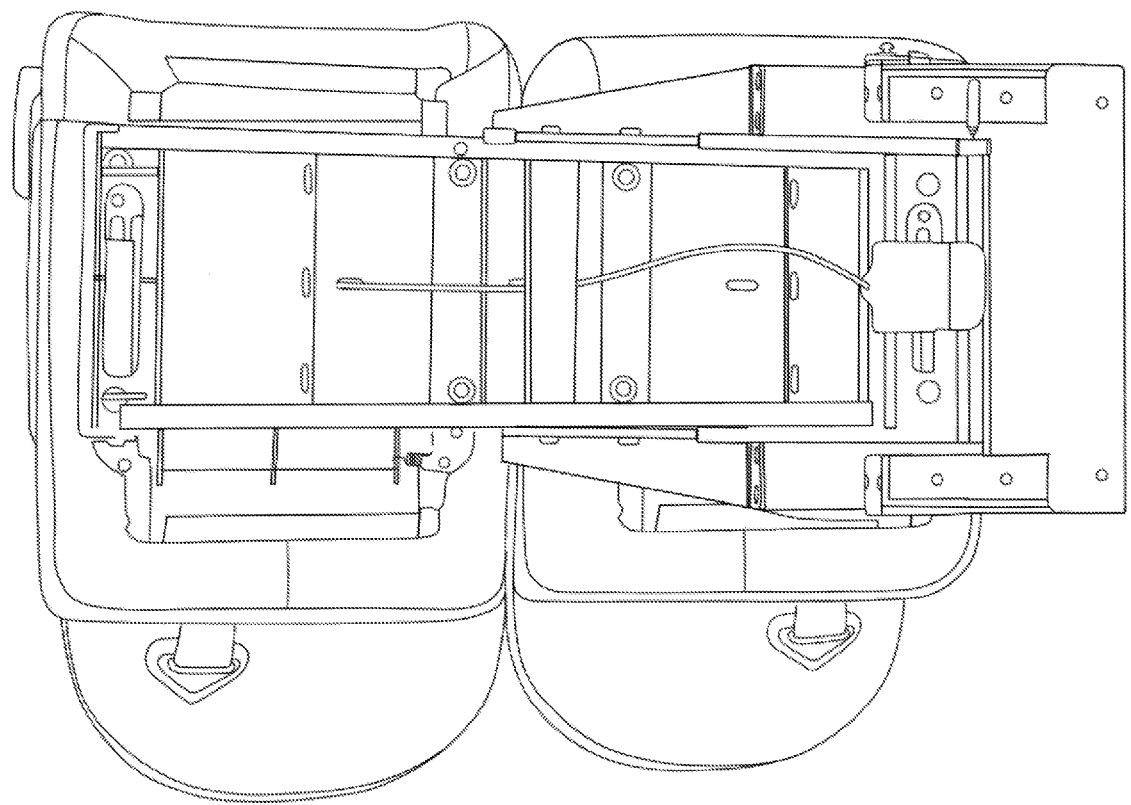
FIG. 14 is a front photographic view of the stowable seat system, including seat covers, in the fully stowed orientation.
Figure 15:
FIG. 15 is a photographic view of the stowable seat system, including seat covers, in an intermediate stowing orientation with the seat back portions folded over the seat bottom portions of the seat frames.
Figure 16:
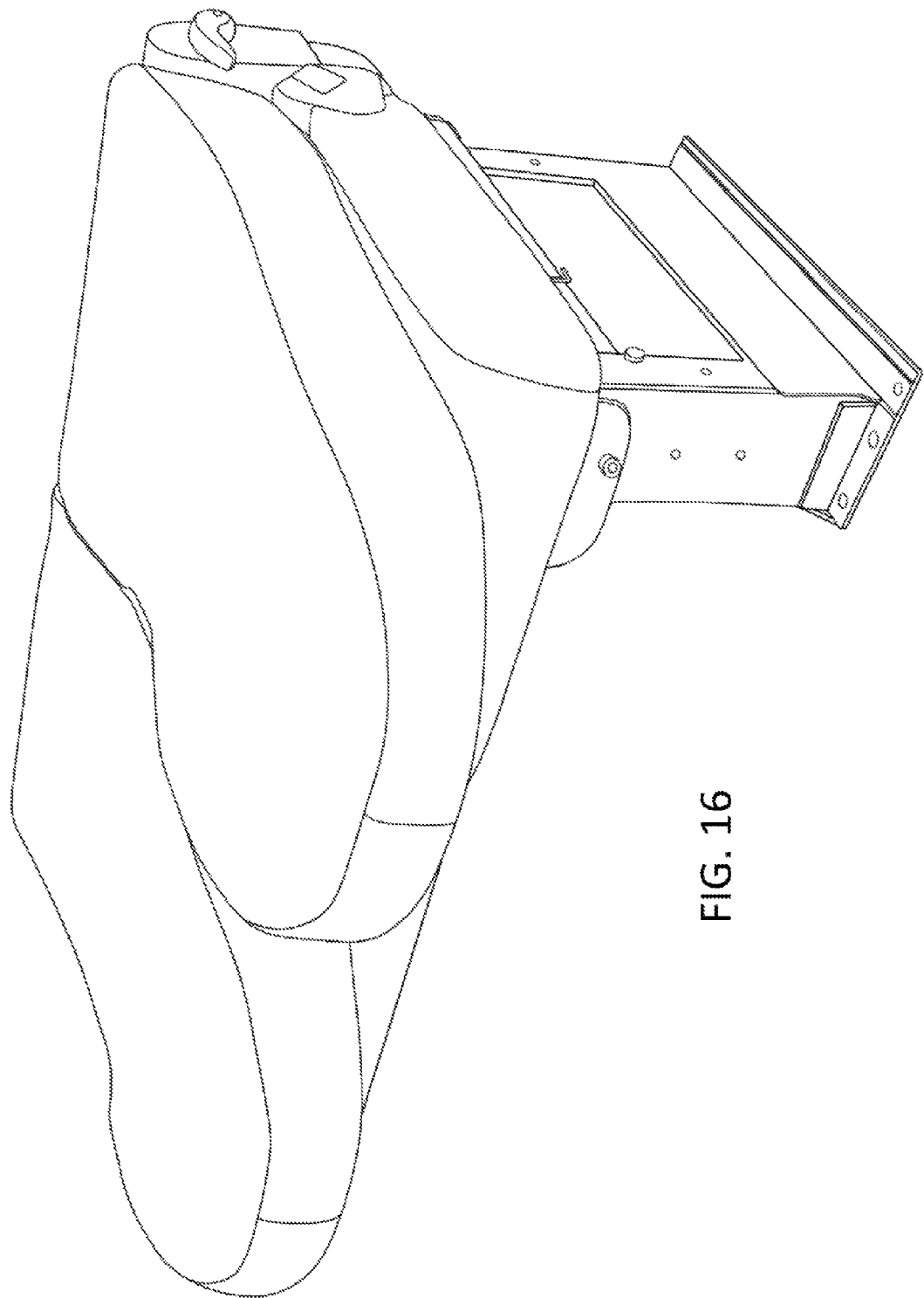
FIG. 16 is another photographic view of the stowable seat system, including seat covers, in an intermediate stowing orientation with the seat back portions folded over the seat bottom portions of the seat frames.
Figure 20E:
FIG. 20*e* is a top view of a part of the seat base.
Figure 20D:
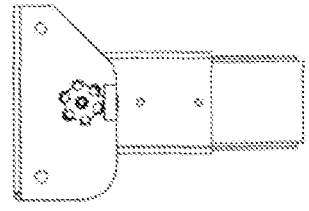
FIG. 20*d* is a second side view of a part of the seat base.
Figure 20C:
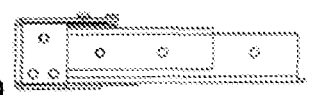
FIG. 20*c* is an end view of a part of the seat base.
Figure 20B:
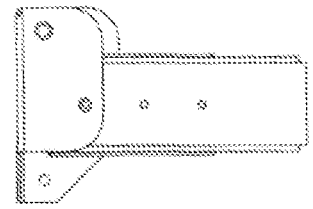
FIG. 20*b* is a first side view of a part of the seat base.
Figure 20A:
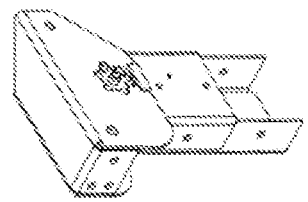
FIG. 20*a* is a perspective view of part of the seat base.
Figure 21C:
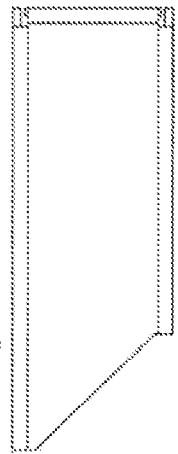
FIG. 21*c* is a first side view of the part of the seat base.
Figure 21F:
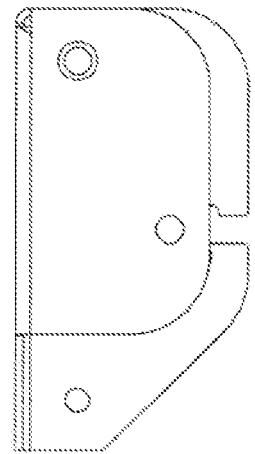
FIG. 21f shows a second side view of the part of the seat base.
Figure 21B:
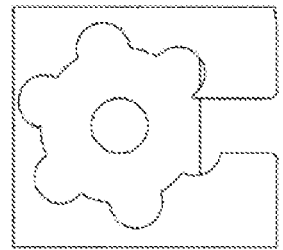
FIG. 21*b* is an enlarged side view of a portion of the part of the seat base.
Figure 21E:
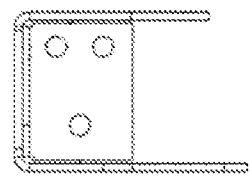
FIG. 21*e* shows an end view of the part of the seat base.
Figure 21A:
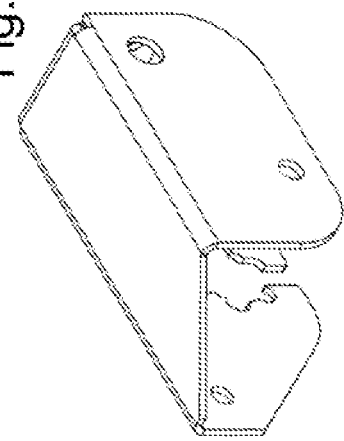
FIG. 21*a* is a perspective view of another part of the seat base.
Figure 21D:
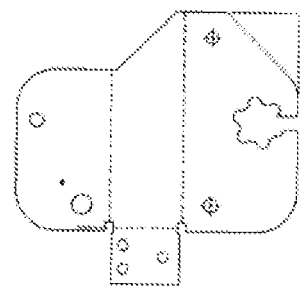
FIG. 21*d* shows a plan view of the stamped part of the seat base before bending.

The seat frame 160 includes a bottom portion 170 and a back portion 180 operationally engaged with the bottom portion 170. The bottom portion 170 includes one or more seat mounting features 172 to permit mechanical engagement with the seat base 120. In some embodiments, the seat mounting features 172 may include a through hole adapted to operationally engage a mechanical engagement component 133. The bottom portion is adapted to support a seating surface 174 adapted for a user to sit upon. The seating surface 174 may be a pad or cushion engaged with the bottom portion 170. Engaged with the bottom portion 170 is a second actuation region 176. The second actuation region 176 is adapted to permit back portion 180 and the bottom portion 170 to be moved with respect to one another. In the embodiment shown in FIGS. 1-23e the second actuation region 176 includes a pivot defining a second axis of rotation 177 such that back portion 180 may be rotated about the second axis of rotation 177 from the deployed orientation similar to that shown in FIGS. 1 and 13 to a stowing orientation similar to that shown in FIGS. 2 and 15. As shown in FIGS. 1-23e, in some embodiments the second axis of rotation 177 is offset from the first axis of rotation 135 wherein the offset is defined by a vector perpendicular to both the second axis of rotation 177 and the first axis of rotation 135, and wherein a projection of the second axis of rotation 177 into a plane normal to the first vector is perpendicular to a projection of the first axis of rotation 135 into the plane normal to the first vector. In other acceptable embodiments, the second actuation region 176 may include a mechanism, such as, without limitation, a linkage, adapted to permit back portion 180 to be moved from the deployed orientation to the stowing orientation. The second actuation region 176 may further be adapted to permit the back portion 180 to be oriented within a range of orientations close to the deployed orientation and thereby angled forwardly or rearwardly to allow a user to select a desired amount of recline in his seat. In one embodiment, as shown in FIGS. 14-16, in the stowing orientation the back portion 180 is oriented along or lying flat against or almost flat against the bottom portion 170. By contrast, in one embodiment, as shown in FIG. 13, in the deployed orientation the back portion 180 is oriented to project away from the bottom portion 170 so as to present a set of surfaces, seating surface 174 and back surface 178, which a user may sit upon and recline against, respectively.

In some embodiments, the second actuation region 176 is operationally engaged with a selectably releasable lock 156 adapted to hold the back portion 180 in a desired orientation with respect to the bottom portion 170. The lock 156 may be selectably releasable by a lever or other manual latch 179. As shown in the non-limiting embodiment in FIG. 18e, the lock 156 may be selectably releasable by a solenoid, motor, or other actuator 157 adapted to move the selectably releasable lock 156 into a desired orientation. As shown in FIG. 18e, the lock 156 may be engaged with a proximity switch or other sensor 158 adapted to detect the state of lock 156. It should be understood that, in other embodiments, one or more sensors 158 could be used to detect the orientation of one or more components of the stowable seat system 100.

Figure 13:
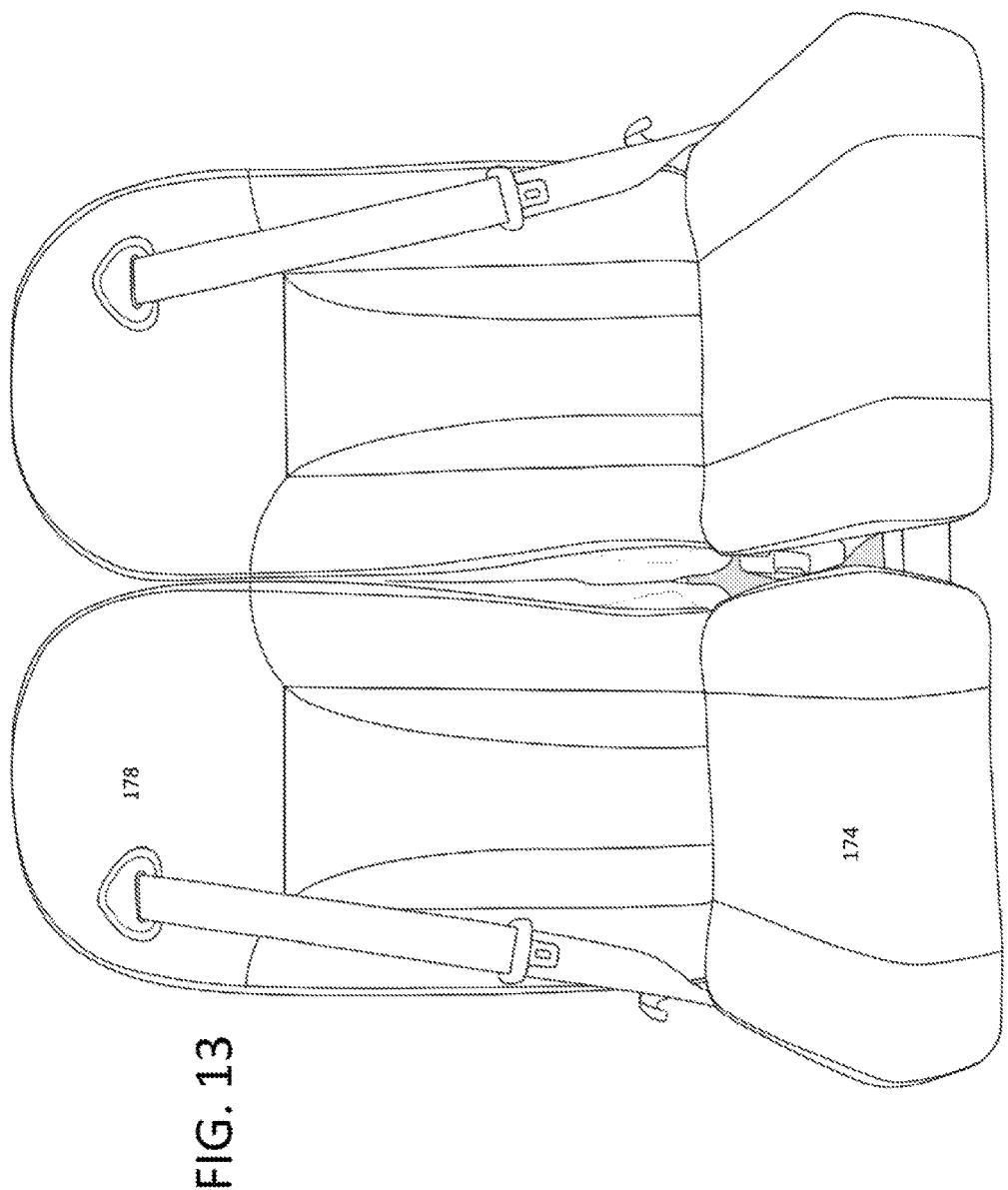
FIG. 13 is a photographic view of the stowable seat system, including seat covers, in the deployed orientation.

FIG. 13 shows one embodiment of the stowable seat system 100 in the deployed orientation. FIG. 1 shows the stowable seat system 100 with the upholstery and cushioning removed to show the infrastructure of the stowable seat system 100 in the deployed orientation. To change the shown stowable seat system 100 from the deployed orientation to the stowed orientation, a user rotates the back portion 180 from the deployed orientation shown in FIGS. 13 and 1 to the stowing orientation shown in FIGS. 2, 3, 15, and 16; and then, once the back portion 180 is in the stowing orientation, the user rotates the seat engagement portion 140 from the substantially horizontal orientation shown in FIGS. 1 and 5 to the substantially vertical orientation shown in FIGS. 3 and 10. The result of this operation is the stowed orientation of the stowable seat system 100 shown in FIG. 14. Much of the floor area occupied by the stowable seat system 100 in the deployed orientation is vacated and open when the stowable seat system 100 is in the stowed orientation. This vacated area may be occupied by a wheelchair such that the stowable seat system 100 permits a seating area to be readily converted from an area adapted to accommodate a wheelchair to one having more conventional seating. In some embodiments the process of changing the stowable seat system 100 from the deployed orientation to the stowed orientation and back may be automated with the required steps being performed by actuators operationally engaged with a controller.

It should be understood that the stowable seat system 100 may be universal in the sense that it may be installed as a right-hand or left-hand seat unit, i.e., on the passenger side or on the driver side.

While principles and modes of operation have been explained and illustrated with regard to particular embodiments, it must be understood, however, that this may be practiced otherwise than as specifically explained and illustrated without departing from its spirit or scope. While the subject matter has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope of the appended claims.

What is claimed is:

1. A stowable seat system comprising:
    a seat base comprising
        a vehicle engagement portion adapted for operational engagement with an associated vehicle, and
        a seat engagement portion movably engaged with the vehicle engagement portion at a first actuation region, the first actuation region comprising a first pivot defining a first axis of rotation that is substantially horizontal, the first actuation region being operationally engaged with a first selectably releasable lock; and
    a seat frame operationally engaged with the seat base, the seat frame comprising
        a bottom portion, and
        a back portion movably engaged with the bottom portion at a second actuation region, the second actuation region comprising a second pivot defining a second axis of rotation, the second actuation region being operationally engaged with a second selectably releasable lock adapted to hold the back portion in a desired range of orientations with respect to the bottom portion;
    wherein the second axis of rotation is offset from the first axis of rotation;

wherein the offset is defined by a first vector perpendicular to both the second axis of rotation and the first axis of rotation; and wherein a projection of the second axis of rotation into a plane normal to the first vector is perpendicular to a projection of the first axis of rotation into the plane normal to the first vector.

2. The stowable seat system of claim 1, the first selectably releasable lock being adapted to hold the seat engagement portion in a desired orientation with respect to the vehicle engagement portion.

3. The stowable seat system of claim 2, wherein the first selectably releasable lock operationally engaged with the first actuation region and the second selectably releasable lock operationally engaged with the second actuation region are selectably releasable by a manual latch.

4. The stowable seat system of claim 3, wherein the vehicle engagement portion is adapted for engagement with a floor of the associated vehicle.

5. The stowable seat system of claim 3, wherein the vehicle engagement portion is adapted for engagement with a wall of the associated vehicle.

6. The stowable seat system of claim 3, further comprising a combination of actuators and sensors adapted to switch the seat system from a deployed orientation to a stowed orientation.

7. The stowable seat system of claim 6 wherein the combination of actuators and sensors comprises
at least one actuator selected from the group consisting of a solenoid and motor, and any combination thereof; and
at least one sensor selected from the group consisting of a proximity switch and a sensor adapted to detect the state of at least one selectably releasable lock.

8. A method of using a stowable seat system comprising:
providing a stowable seat system comprising,
a seat base comprising
a vehicle engagement portion adapted for operational engagement with an associated vehicle, and
a seat engagement portion movably engaged with the vehicle engagement portion at a first actuation region, the first actuation region comprising a first pivot defining a first axis of rotation that is substantially horizontal, the first actuation region being operationally engaged with a first selectably releasable lock, and
a seat frame operationally engaged with the seat base, the seat frame comprising
a bottom portion, and
a back portion movably engaged with the bottom portion at a second actuation region, the second actuation region comprising a second pivot defining a second axis of rotation, the second actuation region being operationally engaged with a second selectably releasable lock adapted to hold the back portion in a desired range of orientations with respect to the bottom portion;
wherein the second axis of rotation is offset from the first axis of rotation;
wherein the offset is defined by a first vector perpendicular to both the second axis of rotation and the first axis of rotation; and
wherein a projection of the second axis of rotation into a plane normal to the first vector is perpendicular to a projection of the first axis of rotation into the plane normal to the first vector;

rotating the back portion from a deployed orientation projecting away from the bottom portion to a stowing orientation lying flat against the bottom portion; and
rotating the seat engagement portion from a horizontal orientation to a vertical orientation.

9. The method of using a stowable seat system of claim 8, the first selectably releasable lock being adapted to hold the seat engagement portion in a desired orientation with respect to the vehicle engagement portion.

10. The method of using a stowable seat system of claim 9, wherein the first selectably releasable lock operationally engaged with the first actuation region and the second selectably releasable lock operationally engaged with the second actuation region are selectably releasable by a manual latch.

11. The method of using a stowable seat system of claim 10, wherein the vehicle engagement portion is adapted for engagement with a floor of the associated vehicle.

12. The method of using a stowable seat system of claim 11, wherein the vehicle engagement portion is adapted for engagement with a wall of the associated vehicle.

13. The method of using a stowable seat system of claim 10, further comprising a combination of actuators and sensors adapted to switch the seat system from a deployed orientation to a stowed orientation.

14. The method of using a stowable seat system of claim 13 wherein the combination of actuators and sensors comprises
at least one actuator selected from the group consisting of a solenoid and motor, and any combination thereof; and
at least one sensor selected from the group consisting of a proximity switch and a sensor adapted to detect the state of at least one selectably releasable lock.

15. A stowable seat system comprises:
a seat base comprising
a vehicle engagement portion adapted for operational engagement with the floor of an associated vehicle, and
a seat engagement portion movably engaged with the vehicle engagement portion at a first actuation region,
the first actuation region comprising a pivot defining a first axis of rotation that is substantially horizontal, and
wherein the first actuation region is operationally engaged with a selectably releasable first lock adapted to hold the seat engagement portion in a desired orientation with respect to the vehicle engagement portion, the first lock being selectably releasable by a manual latch;
a seat frame operationally engaged with the seat base, the seat frame comprising a bottom portion, and
a back portion movably engaged with the bottom portion at a second actuation region, the second actuation region comprising a pivot defining a second axis of rotation;
wherein the second axis of rotation is offset from the first axis of rotation;
wherein the offset is defined by a first vector perpendicular to both the second axis of rotation and the first axis of rotation;
wherein a projection of the second axis of rotation into a plane normal to the first vector is perpendicular to a projection of the first axis of rotation into the plane normal to the first vector;
wherein the second actuation region is operationally engaged with a selectably releasable second lock adapted to hold the back portion in a desired orientation with respect to the bottom portion, the second lock being selectably releasable by a manual latch; and further comprising a combination of actuators and sensors adapted to switch the seat system from a deployed orientation to a stowed orientation.

16. The stowable seat system of claim 15 wherein the combination of actuators and sensors comprises
   at least one actuator selected from the group consisting of a solenoid and motor, and any combination thereof; and
   at least one sensor selected from the group consisting of a proximity switch and a sensor adapted to detect the state of at least one selectably releasable lock.

* * * * *